(12) United States Patent
Nakano et al.

(10) Patent No.: US 12,732,687 B2
(45) Date of Patent: Sep. 8, 2026

(54) ELECTRONIC DEVICE, DISPLAY METHOD, AND PROGRAM

(71) Applicant: KYOCERA Corporation, Kyoto (JP)

(72) Inventors: Takeshi Nakano, Yokohama (JP); Keisuke Okawa, Yokohama (JP); Yuusuke Suzuki, Kawasaki (JP); Tomokazu Ohta, Moriyama (JP)

(73) Assignee: KYOCERA Corporation, Kyoto (JP)

( * ) Notice: Subject to any disclaimer, the term of this patent is extended or adjusted under 35 U.S.C. 154(b) by 78 days.

(21) Appl. No.: 18/618,393

(22) Filed: Mar. 27, 2024

(65) Prior Publication Data

US 2024/0397194 A1 Nov. 28, 2024

(30) Foreign Application Priority Data

May 22, 2023 (JP) ................................ 2023-083956

(51) Int. Cl.

*H04N 23/63* (2023.01)
*H04N 23/45* (2023.01)
*H04N 23/60* (2023.01)
*H04N 23/61* (2023.01)

(52) U.S. Cl.

CPC ........... *H04N 23/632* (2023.01); *H04N 23/45* (2023.01); *H04N 23/61* (2023.01); *H04N 23/633* (2023.01); *H04N 23/64* (2023.01)

(58) Field of Classification Search

CPC ...... H04N 23/632; H04N 23/45; H04N 23/61; H04N 23/633; H04N 23/64; H04N 5/272; H04N 23/631; H04N 23/635; H04N 23/69

See application file for complete search history.

(56) References Cited

U.S. PATENT DOCUMENTS 6,624,846 B1 * 9/2003 Lassiter .............. G06F 3/04815 348/E5.042
7,224,374 B2 * 5/2007 Hasegawa ............. H04N 7/185 348/E7.086
8,711,265 B2 * 4/2014 Kawamura ........ H04N 1/00453 348/333.12
8,823,857 B2 * 9/2014 Kazama ................ H04N 23/69 348/333.05
11,743,583 B2 8/2023 Nishimura et al.
12,007,668 B2 6/2024 Shabtay
12,443,091 B2 10/2025 Shabtay
2010/0245630 A1 * 9/2010 Kurokawa ............ H04N 23/69 348/240.99

(Continued)

FOREIGN PATENT DOCUMENTS

CN 114641805 A 6/2022
JP 2011-055251 A 3/2011

(Continued)

*Primary Examiner* — Timothy J Henn
(74) *Attorney, Agent, or Firm* — Studebaker Brackett PLLC

(57) ABSTRACT

An electronic device includes at least one camera configured to generate a first image by capturing an image of a subject and a second image by capturing a magnified image of a part of the subject, a display configured to receives a touch operation, and a controller. The controller is configured to give a mark to a part of the first image corresponding to the second image and display the second image on the display on a basis of a touch operation performed on the display that is displaying the first image.

16 Claims, 9 Drawing Sheets

(56) References Cited

U.S. PATENT DOCUMENTS

| | | | | |
|---|---|---|---|---|
| 2010/0289937 | A1* | 11/2010 | Hada | H04N 23/635 348/E5.022 |
| 2012/0316783 | A1* | 12/2012 | Brillhart | G02B 23/12 701/484 |
| 2019/0082101 | A1* | 3/2019 | Baldwin | H04N 23/69 |
| 2019/0199926 | A1 | 6/2019 | An et al. | |
| 2023/0247279 | A1* | 8/2023 | Shimada | H04N 23/62 348/333.03 |

FOREIGN PATENT DOCUMENTS

| | | |
|---|---|---|
| JP | 2013-078075 A | 4/2013 |
| JP | 2020-162139 A | 10/2020 |

* cited by examiner 12
31
30
27
IMAGE DISPLAYED IN SMALL WINDOW.
TOUCH IT TO ADJUST POSITION AND SIZE.
24
AAA TOWN, BBB WARD,
CCC CITY, DDD PREFECTURE
mm/dd/yy/hh/mm
23
26
32

ELECTRONIC DEVICE, DISPLAY METHOD, AND PROGRAM

CROSS REFERENCES TO RELATED APPLICATIONS

The present application contains subject matter related to Japanese Patent Application No. 2023-083956 filed in the Japan Patent Office on May 22, 2023, the entire contents of which are incorporated herein by reference.

BACKGROUND OF THE INVENTION

1. Field of the Invention

The present disclosure relates to an electronic device, a display method, and a program.

2. Description of the Related Art

Techniques for generating two images and displaying the generated two images are known. Japanese Unexamined Patent Application Publication No. 2011-55251, for example, describes displaying of an image of a subject and an image of a person who has captured the image on a liquid crystal panel.

SUMMARY OF THE INVENTION

In an embodiment of the present disclosure, an electronic device includes at least one camera, a display, and a controller. The at least one camera is configured to generate a first image by capturing an image of a subject and a second image by capturing a magnified image of a part of the subject. The display is configured to receive a touch operation. The controller is configured to give a mark to a part of the first image corresponding to the second image and display the second image on the display, on a basis of a touch operation performed on the display that is displaying the first image.

In another embodiment of the present disclosure, a display method includes giving a mark to a part of a first image corresponding to a second image and displaying the second image on a display on a basis of a touch operation performed on the display that is displaying the first image. The first image is an image generated by capturing an image of a subject. The second image is an image generated by capturing a magnified image of a part of the subject.

In another embodiment of the present disclosure, a program causes a computer to perform operations including giving a mark to a part of a first image corresponding to a second image on a basis of a touch operation performed on a display that is displaying the first image. The first image is an image generated by capturing an image of a subject. The second image is an image generated by capturing a magnified image of a part of the subject.

DESCRIPTION OF THE PREFERRED EMBODIMENTS

Techniques for displaying two images can still be improved in terms of convenience of users. According to an embodiment of the present disclosure, techniques for displaying two images can be improved in terms of convenience of users.

The embodiment of the present disclosure will be described hereinafter with reference to the drawings.

Figure 1:
FIG. 1 is a diagram illustrating an example of use of an electronic device according to an embodiment of the present disclosure.
Figure 1:
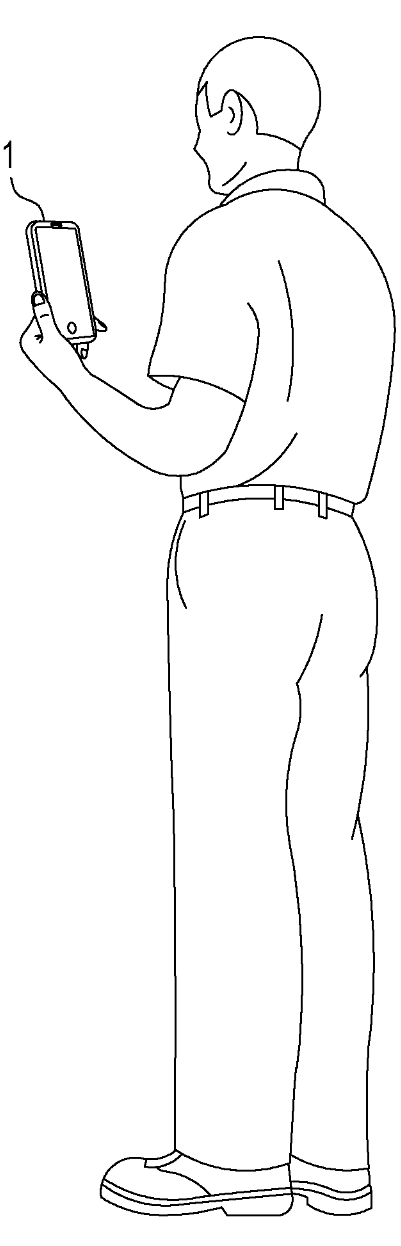

As illustrated in FIG. 1, in the present embodiment, an electronic device 1 is used by a user. The users captures an image of a subject using the electronic device 1. The electronic device 1 is, for example, a smartphone. The electronic device 1 may be any device capable of capturing an image of a subject.

Figure 2:
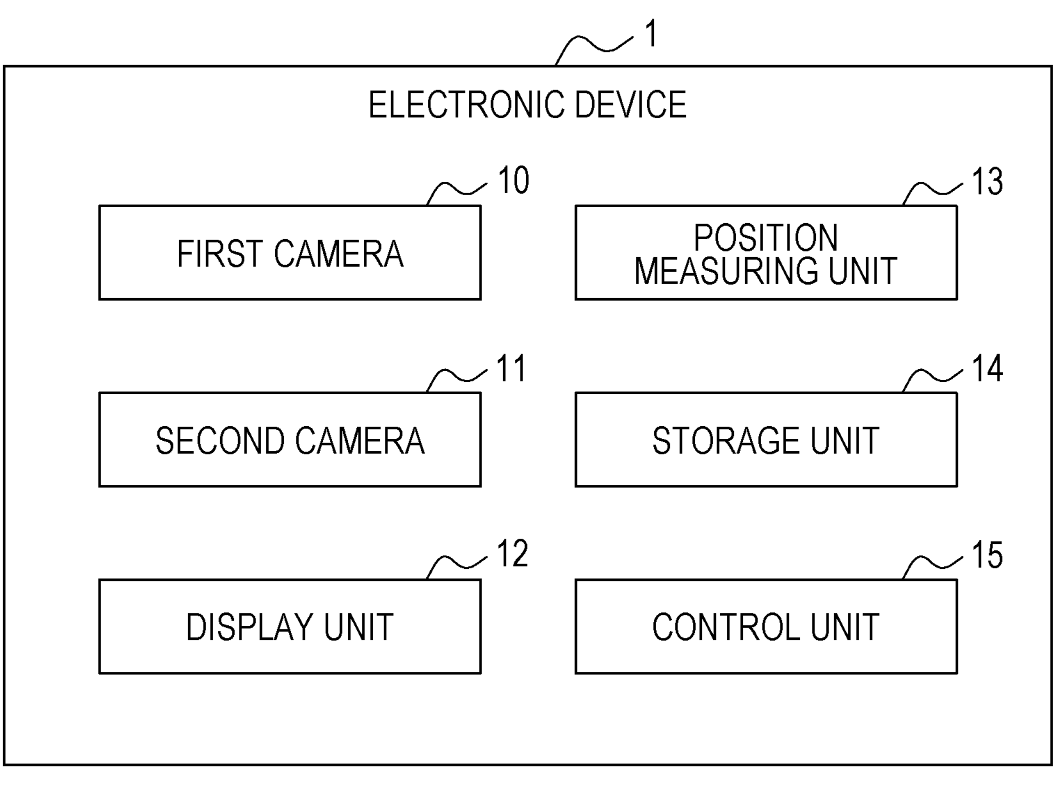
FIG. 2 is a block diagram illustrating the electronic device illustrated in FIG. 1.

As illustrated in FIG. 2, the electronic device 1 includes a first camera 10, a second camera 11, a display unit 12, a position measuring unit 13, a storage unit 14, and a control unit 15. In the present embodiment, the electronic device 1 includes the first camera 10 and the second camera 11, that is, two cameras. The electronic device 1, however, may include at least one camera.

The first camera 10 is capable of generating a first image of a subject by capturing an image of a subject. The first camera 10 is, for example, a wide-angle camera. The first camera 10, however, is not limited to a wide-angle camera. The first camera 10 may be any camera such as an ultra-wide-angle camera or a telephoto camera. The first camera 10 includes an imaging device and a lens unit. The lens unit includes at least one lens. The lens is a multifocal lens. The lens, however, may be a prime lens, instead. The first camera 10 has an autofocus function.

The second camera 11 is capable of capturing an image of a subject at a greater magnification than the first camera 10. The second camera 11 is capable of generating a second image of a subject by capturing a magnified image of the subject. The second camera 11 is, for example, a macro camera. The second camera 11, however, is not limited to a macro camera. The second camera 11 may be any camera capable of capturing an image of a subject at a greater magnification than the first camera 10. The second camera 11 includes an imaging device and a lens unit. The lens unit includes at least one lens. The lens is a prime lens. The lens, however, may be multifocal lens, instead.

A minimum focus distance of the second camera 11 is smaller than that of the first camera 10. A minimum focus distance is a minimum distance with which a camera can capture an image of a subject.

The display unit 12 is capable of displaying various pieces of information. The display unit 12 is also capable of receiving touch operations. The display unit 12 may be a touch screen display, where a display and a touch screen are integrated with each other. The display is, for example, a liquid crystal display (LCD) or an organic electroluminescent (EL) display. The touch screen is capable of detecting a position on the touch screen touched by the user with his/her finger or the like. The display unit 12 receives a touch operation by detecting a position touched by the user.

The position measuring unit 13 is capable of obtaining positional information regarding the electronic device 1. The position measuring unit 13 includes at least one reception module corresponding to a satellite positioning system. The reception module corresponds, for example, to a global positioning system (GPS).

The storage unit 14 includes at least one semiconductor memory, at least one magnetic memory, at least one optical memory, or a combination of at least two of these. The semiconductor memory is, for example, a random-access memory (RAN) or a read-only memory (ROM). The RAM is, for example, a static random-access memory (SRAM) or a dynamic random-access memory (DRAM). The ROM is, for example, an electrically erasable programmable read-only memory (EEPROM). The storage unit 14 may function as a main storage device, an auxiliary storage device, or a cache memory. The storage unit 14 stores data used to operate the electronic device 1 and data obtained as a result of operation of the electronic device 1.

The control unit 15 includes at least one processor, at least one dedicated circuit, or a combination of these. The processor is, for example, a general-purpose processor such as a central processing unit (CPU) or a graphics processing unit (GPU) or a dedicated processor specialized in a certain type of processing. The dedicated circuit is, for example, a field-programmable gate array (FPGA) or an application-specific integrated circuit (ASIC). The control unit 15 performs processing relating to the operation of the electronic device 1 while controlling other components of the electronic device 1.

The control unit 15 displays, on the basis of a touch operation performed on the display unit 12 that is displaying the first image, the second image and gives a mark to a part of the first image corresponding to the second image. An example of this processing will be described with reference to FIG. 3.

Figure 3:
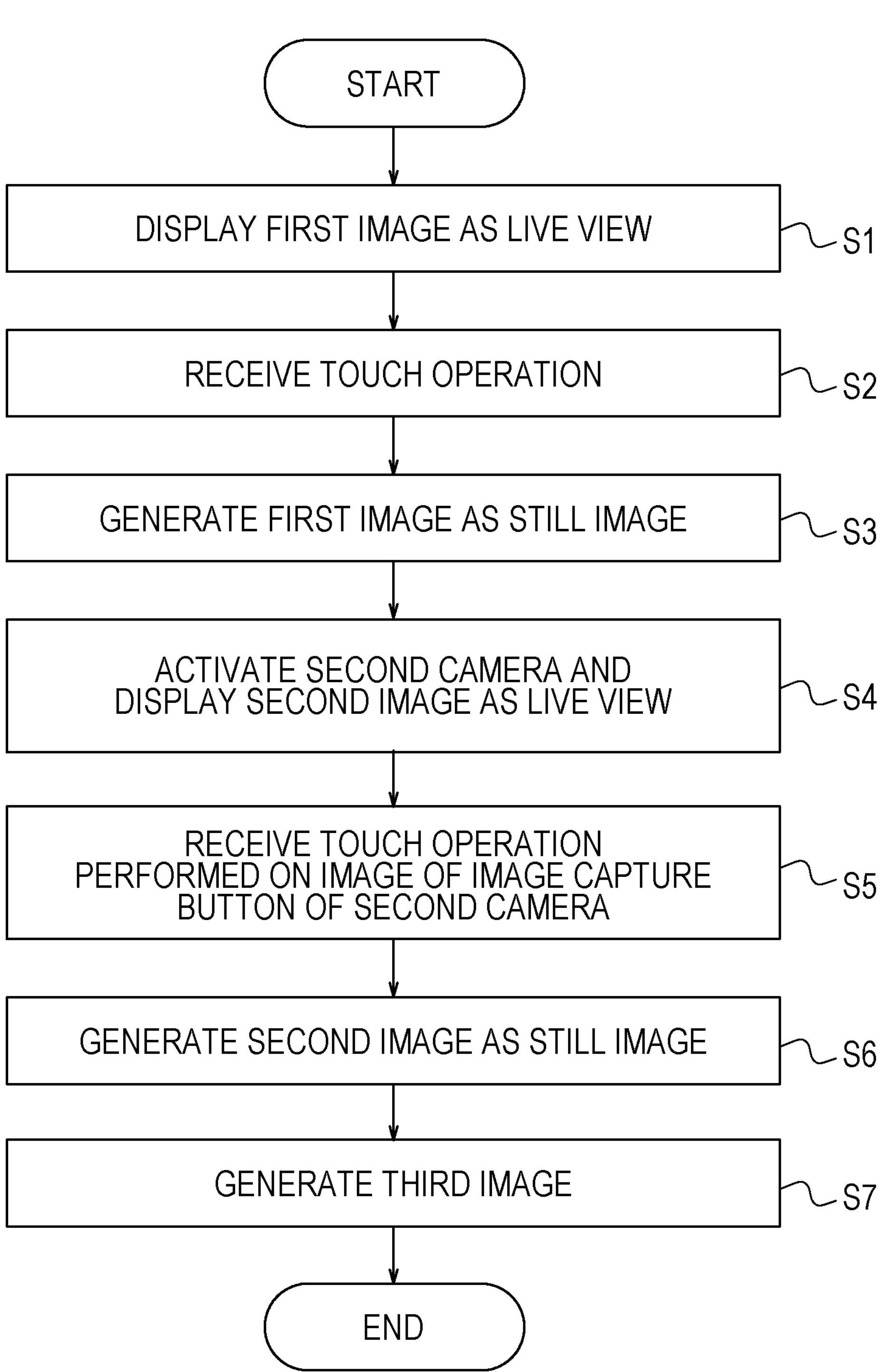
FIG. 3 is a flowchart illustrating an example of a procedure of a display process according to the embodiment of the present disclosure.

FIG. 3 is a flowchart illustrating an example of a procedure of a display process according to the embodiment of the present disclosure. The control unit 15 activates the first camera 10 on the basis of a user operation and starts processing in step S1.

Figure 4:
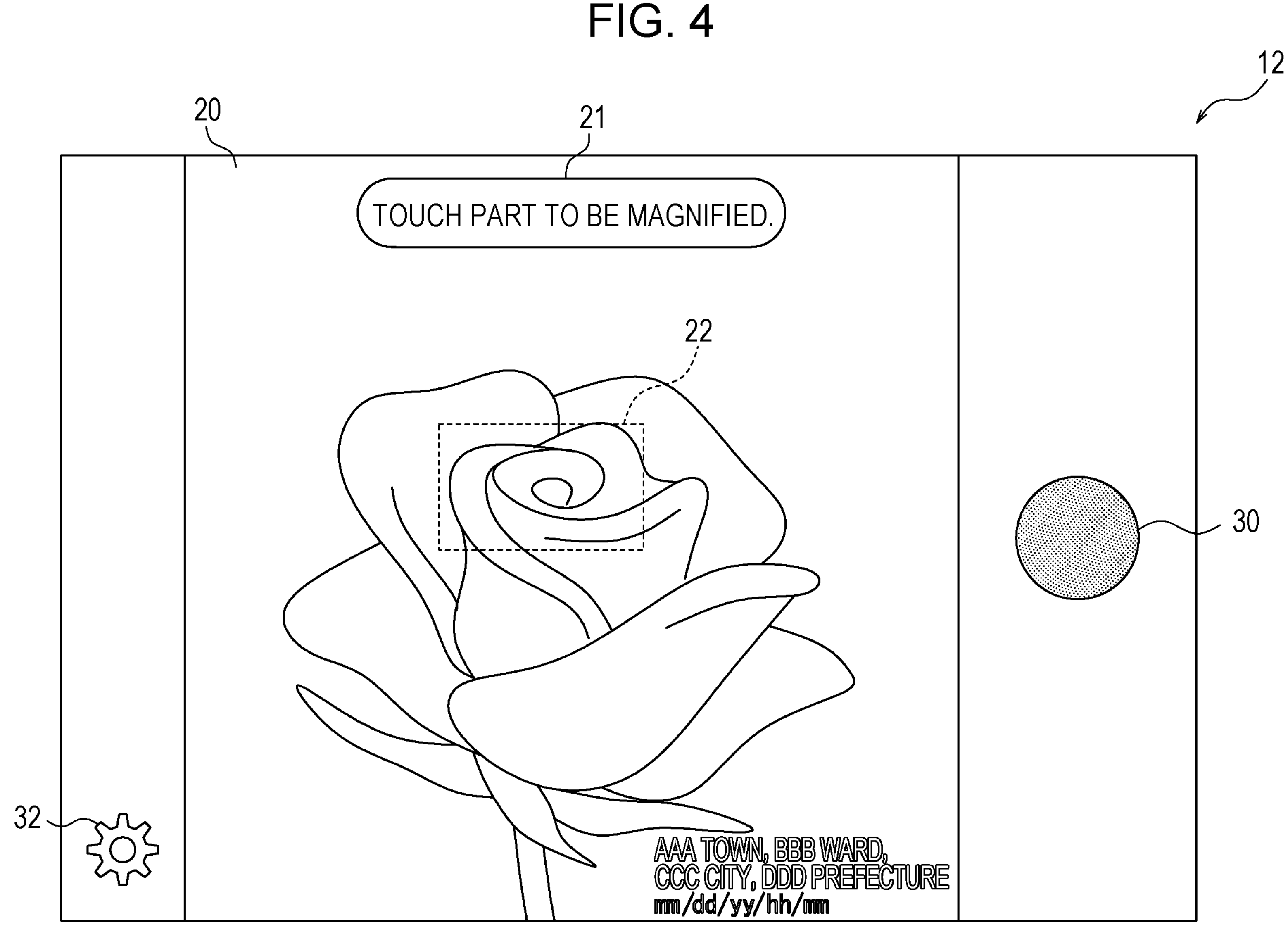
FIG. 4 is a diagram illustrating an example of a display mode of a display unit illustrated in FIG. 1.

In the processing in step S1, the control unit 15 causes, after activating the first camera 10, the first camera 10 to focus on a subject. After causing the first camera 10 to focus on the subject, the control unit 15 captures an image of the subject using the first camera 10 to generate a first image. The control unit 15 may generate the first image by capturing an image of the subject at any frame rate. After generating the first image, the control unit 15 displays the first image on the display unit 12 as a live view. The live view refers to rea-time display of an image captured and generated by the camera. As illustrated in FIG. 4, for example, the control unit 15 displays a first image 20 on the display unit 12 as a live view. The first image 20 shows a rose as a subject.

In the processing in step S1, the control unit 15 may obtain positional information regarding the electronic device 1 using the position measuring unit 13. The control unit 15 may display the positional information regarding the electronic device 1 on the display unit 12 along with the first image. The control unit 15 may superimpose the positional information regarding the electronic device 1 upon the first image. In FIG. 4, for example, the control unit 15 displays the positional information "Town AAA, Ward BBB, City CCC, Prefecture DDD" regarding the electronic device 1 along with the first image 20. When the positional information regarding the electronic device 1 is displayed, the user can easily understand a place where he/she is capturing the image of a subject. The control unit 15 may increase a degree of transparency of text indicating the positional information regarding the electronic device 1 displayed on the display unit 12. In this case, the control unit 15 may increase the degree of transparency of the text indicating the positional information regarding the electronic device 1 displayed on the display unit 12 higher than the degree of transparency of the text indicating the positional information regarding the electronic device 1 given to a third image, which will be described later. Alternatively, the control unit 15 may increase the degree of transparency of the text indicating the positional information regarding the electronic device 1 displayed on the display unit 12 by setting the degree of transparency of the text indicating the positional information regarding the electronic device 1 displayed on the display unit 12 at a first certain value. The first certain value may be set in consideration of visibility of the first image at a time when the text indicating the positional information regarding the electronic device 1 is superimposed upon the first image. The first certain value is, for example, 50%. By increasing the degree of transparency of the text indicating the positional information regarding the electronic device 1 like this, the first image does not become difficult to see due to the positional information regarding the electronic device 1 when the positional information regarding the electronic device 1 is superimposed upon the first image.

In the processing in step S1, the control unit 15 may display information regarding present time on the display unit 12 along with the first image. The control unit 15 may superimpose the information regarding the present time upon the first image. In FIG. 4, for example, the control unit 15 displays the present time "mm/dd/yy/hh/mm" along with the first image 20. When the present time is displayed, the user can easily understand a time at which he/she is capturing the image of a subject. The control unit 15 may increase a degree of transparency of text indicating the present time displayed on the display unit 12. In this case, the control unit 15 may increase the degree of transparency of the text indicating the present time displayed on the display unit 12 higher than the degree of transparency of the text indicating the present time given to the third image, which will be described later. Alternatively, the control unit 15 may increase the degree of transparency of the text indicating the present time displayed on the display unit 12 by setting the degree of transparency of the text indicating the present time displayed on the display unit 12 at a second certain value. The second certain value may be set in consideration of visibility of the first image at a time when the text indicating the present time is superimposed upon the first image. The second certain value may be the same as or different from the first certain value. By increasing the degree of transparency of the text indicating the present time like this, the first image does not become difficult to see due to the information regarding the present time when the information regarding the present time is superimposed upon the first image. The control unit 15 may update, as necessary, the present time displayed on the display unit 12.

In the processing in step S1, the control unit 15 may display an image of an image capture button of the second camera 11 on the display unit 12 that is displaying the first image as a live view. The image of the image capture button of the second camera 11 is an image for receiving, through a touch operation, an operation command for generating the second image as a still image. In FIG. 4, for example, the control unit 15 displays an image 30 of the image capture button of the second camera 11. At this point in time, however, the control unit 15 does not allow a touch operation on the image of the image capture button of the second camera 11 to be received. As illustrated in FIG. 4, therefore, luminance or brightness of the image 30 of the image capture button may be lower than that of other images displayed on the display unit 12. Since the luminance or brightness of the image 30 of the image capture button is low, the user can easily understand that he/she is not allowed to input a touch operation through the image 30.

In the processing in step S1, the control unit 15 may display a first notification on the display unit 12 when displaying the first image. The first notification is a notification for prompting the user to touch a part of the first image to be captured at a greater magnification. In FIG. 4, for example, the control unit 15 displays a first notification 21. The first notification 21 includes text "Touch part to be magnified". The user reads the first notification and touches the part of the first image displayed on the display unit 12 whose image is to be captured by the second camera 11 at a greater magnification. When the user desires to capture a magnified image of a central part of the rose shown in the first image 20 illustrated in FIG. 4, for example, the user touches a part 22, which is the central part of the rose.

In processing in step S2, the control unit 15 receives a touch operation performed on the display unit 12 that is displaying the first image as a live view. In FIG. 4, for example, the control unit 15 receives a touch operation performed on the part 22.

Figure 5:
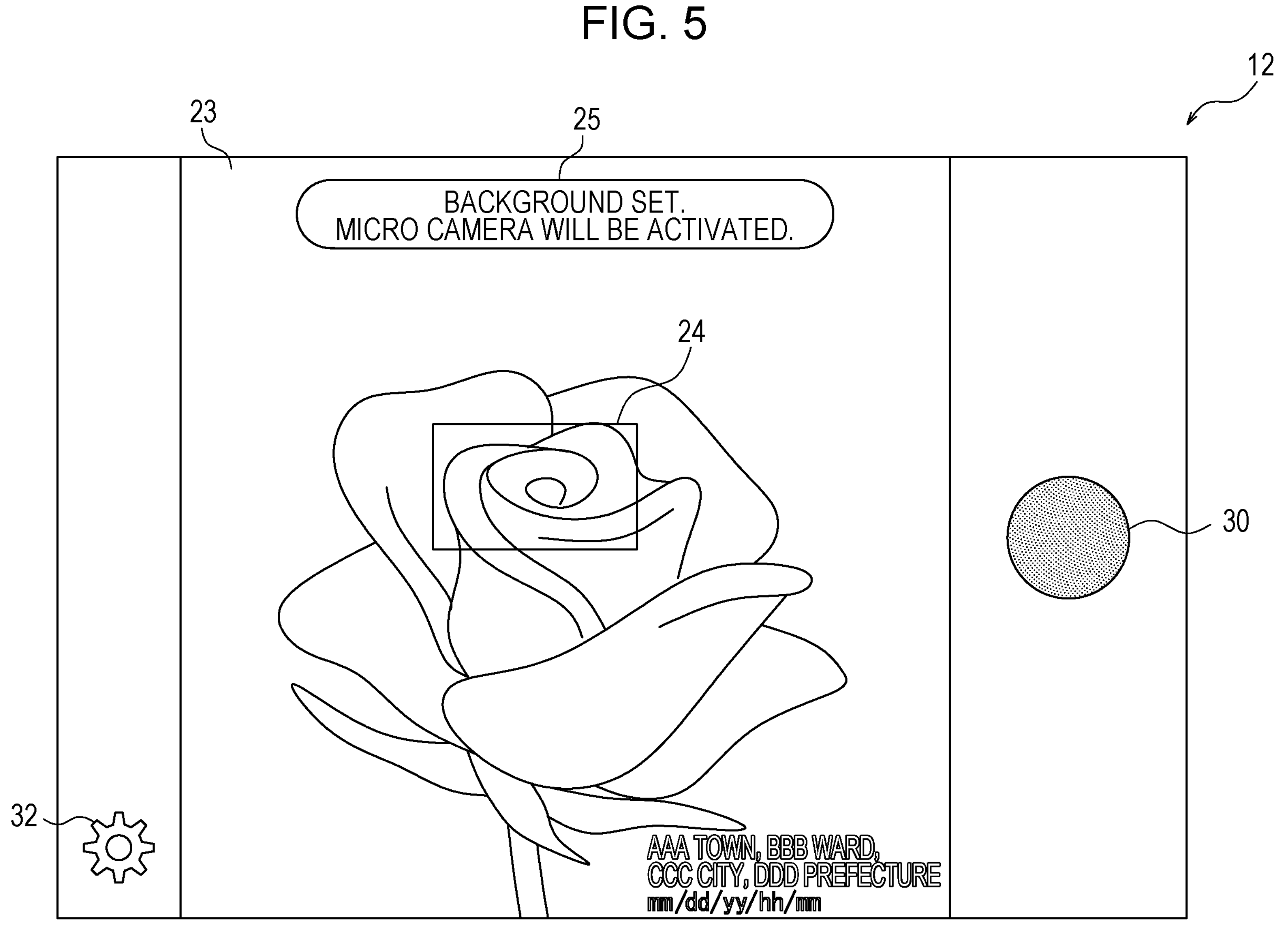
FIG. 5 is a diagram illustrating another example of the display mode of the display unit illustrated in FIG. 1.

In processing in step S3, upon receiving the touch operation in the processing in step S2, the control unit 15 generates the first image as a still image using the first camera 10. The control unit 15 displays, on the display unit 12, the first image generated as a still image. The control unit 15 gives a mark to a part of the first image displayed on the display unit 12 on which the touch operation has been received in the processing in step S2. As illustrated in FIG. 5, for example, the control unit 15 gives a frame 24 to a first image 23 and displays the first image 23 on the display unit 12. The first image 23 is a still image. The frame 24 corresponds to the part 22 illustrated in FIG. 4.

The first image generated in the processing in step S3 as a still image is set as a background of the third image in processing in step S7, which will be described later. The control unit 15, therefore, may display, on the display unit 12, a second notification for notifying the user that the background has been set. In processing in step S4, which will be described later, the control unit 15 activates the second camera 11. The second notification, therefore, may also notify the user that the second camera 11 will be activated along with the setting of the background. In FIG. 5, for example, the control unit 15 displays a second notification 25 on the display unit 12. The second notification 25 includes text "Background set. Micro camera will be activated". The user can understand, by reading the second notification, that the first image displayed on the display unit 12 as a still image has been set as the background of the third image, which will be described later. The user can also understand, by reading the second notification, that the second camera 11 will be activated.

Figure 6:
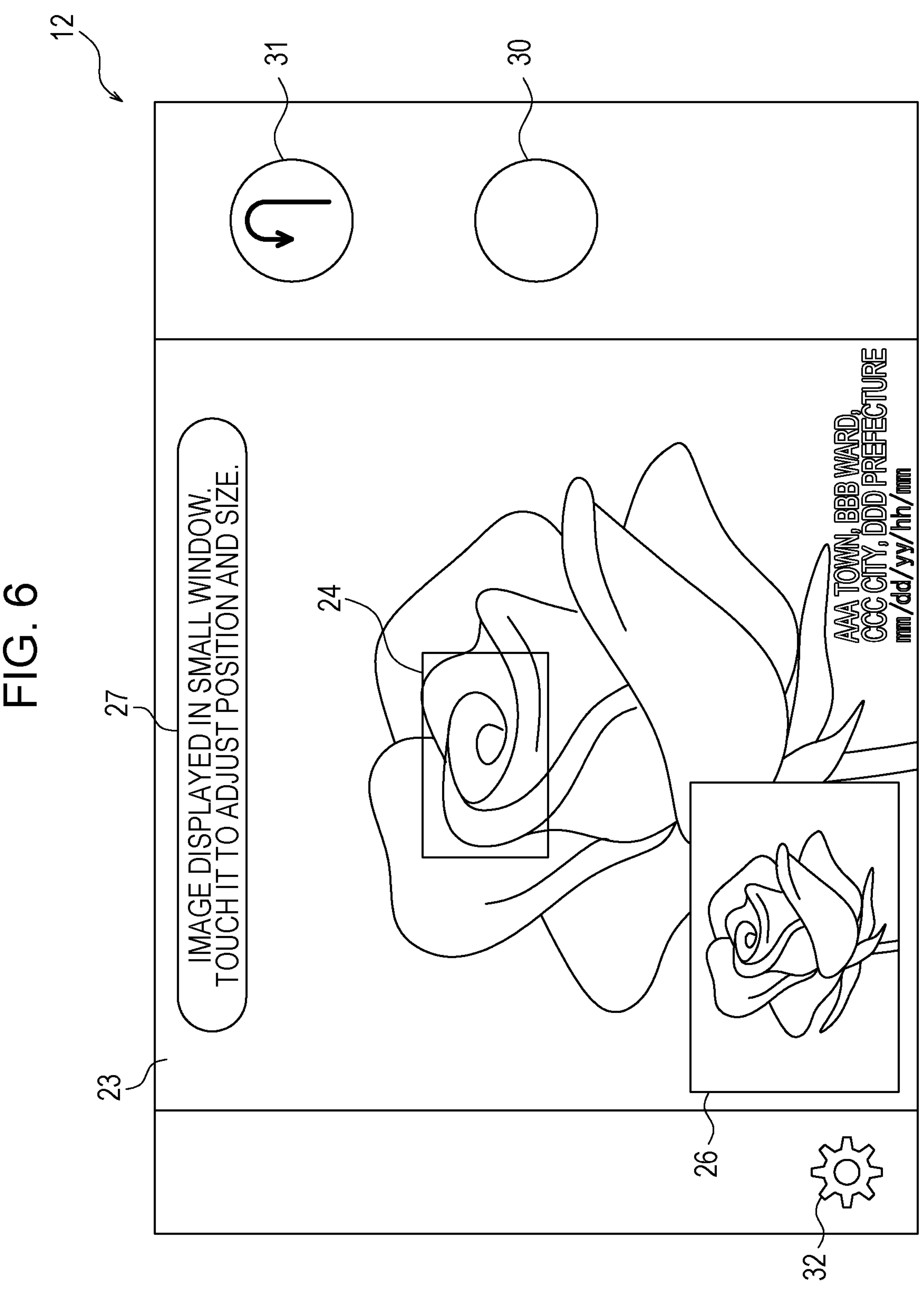
FIG. 6 is a diagram illustrating another example of the display mode of the display unit illustrated in FIG. 1.

In the processing in step S4, the control unit 15 stops the first camera 10 and activates the second camera 11. After activating the second camera 11, the control unit 15 generates the second image using the second camera 11. The control unit 15 displays the generated second image on the display unit 12 as a live view. The control unit 15 may superimpose the second image upon the first image. As illustrated in FIG. 6, for example, the control unit 15 displays a second image 26 on the display unit 12 as a live view. The control unit 15 also superimposes the second image 26 upon the first image 23. In FIG. 6, the control unit 15 displays the second image 26 in a lower-left part of the display unit 12. The control unit 15 may reduce the second image 26 smaller than the first image 23 in size.

In the processing in step S4, the control unit 15 may adjust a position or size of the second image on the display unit 12 on the basis of a touch operation performed on the display unit 12 that is displaying the second image as a live view. When displaying the second image on the display unit 12, therefore, the control unit 15 may display a third notification for notifying the user that at least the position or the size of the second image can be adjusted. The control unit 15 may display, on the display unit 12, the third notification for notifying the user that the second image is displayed on the display unit 12 and that at least the position or the size of the second image can be adjusted. In FIG. 6, for example, both the position and the size of the second image can be adjusted. The control unit 15, therefore, displays a third notification 27 on the display unit 12. The third notification includes text "Image displayed in small window. Touch it to adjust position and size". The user can understand, by reading the third notification, that at least the position or the size of the second image can be adjusted. The user touches the display unit 12 if he/she desires to adjust the position or the like of the second image.

In the processing in step S4, after activating the second camera 11, the control unit 15 may allow a touch operation on the image 30 of the image capture button of the second camera 11 to be received. As illustrated in FIG. 6, for example, the control unit 15 may increase luminance of the image 30 of the image capture button higher than that of the image 30 illustrated in FIG. 4. Since the luminance of the image 30 of the image capture button increases, the user can easily understand that a touch operation on the image 30 has been allowed to be received.

In the processing in step S4, after displaying the first image, which is the generated still image, on the display unit 12, the control unit 15 displays an image of a return button on the display unit 12. The image of the return button is an image for receiving a touch operation for returning to the processing for displaying the first image as a live view, that is, the processing in step S1. By returning to the processing for displaying the first image as a live view, the user can generate the first image, which is a still image set as the background of the third image, again. In FIG. 6, for example, the control unit 15 displays an image 31 of the return button on the display unit 12. Upon receiving a touch operation performed on the image of the return button, the control unit 15 may return to the processing in step S1.

After the processing in step S4, the user brings the electronic device 1 closer to the rose in order to capture an image of the central part of the rose using the second camera 11. The user brings the electronic device 1 closer to the rose until the second camera 11 focuses on the central part of the rose. When the second camera 11 focuses on the central part of the rose, the user touches the image 30 of the image capture button of the second camera 11 illustrated in FIG. 6.

In processing in step S5, the control unit 15 receives a touch operation performed on the image of the image capture button of the second camera 11. Upon receiving the touch operation, the control unit 15 generates the second image as a still image using the second camera 11 (step S6). For example, the control unit 15 generates a second image 29, which is a still image illustrated in FIG. 7, which will be referred to later, using the second camera 11.

Figure 7:
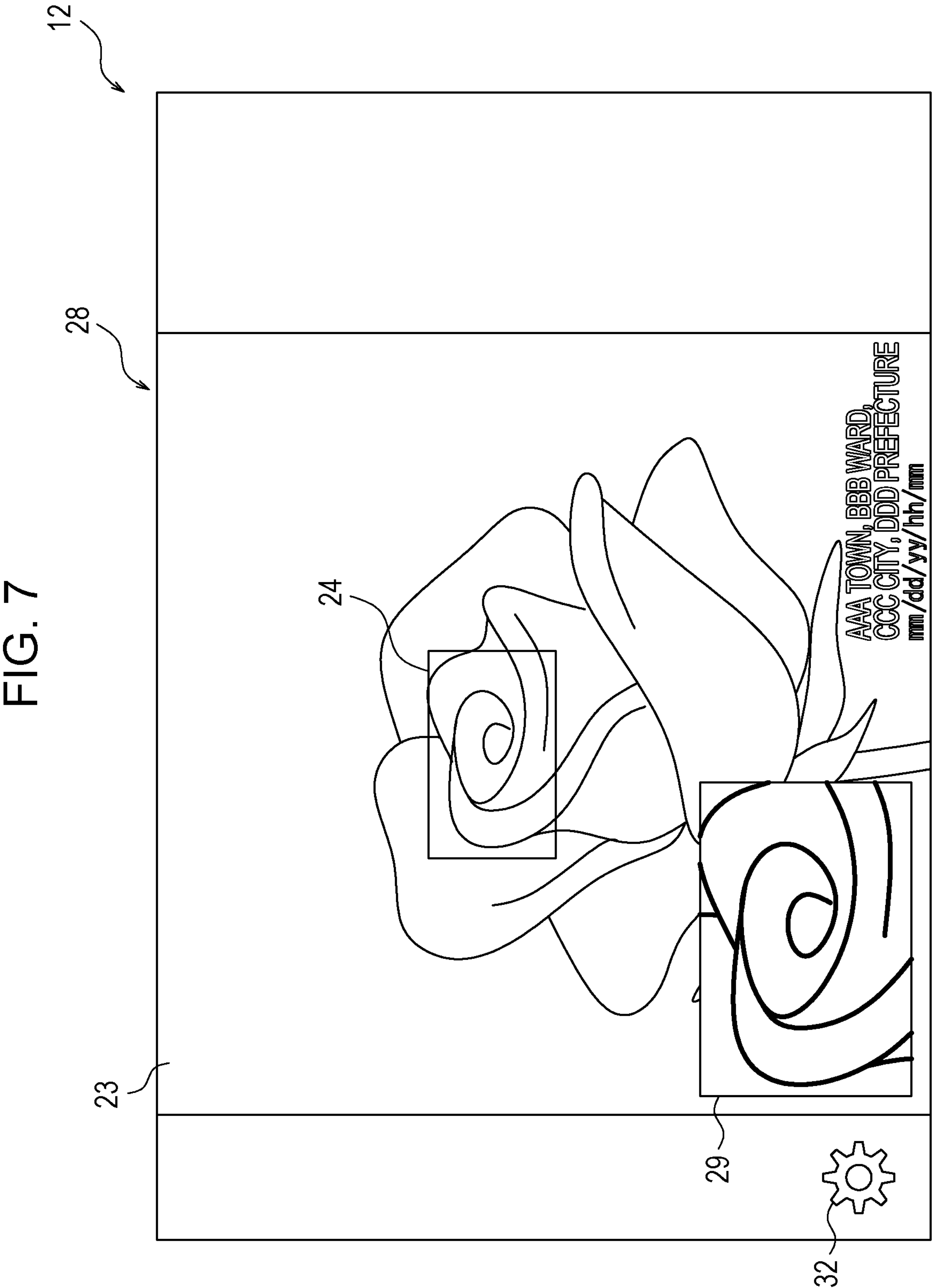
FIG. 7 is a diagram illustrating another example of the display mode of the display unit illustrated in FIG. 1.

In the processing in step S7, the control unit 15 generates the third image by superimposing the second image upon the first image. The control unit 15 generates the third image by superimposing the second image generated in the processing in step S6 as a still image upon the first image generated in the processing in step S3 as a still image. The control unit 15 may set the first image as the background of the third image by superimposing the second image upon the first image. The control unit 15 displays the generated third image on the display unit 12. As illustrated in FIG. 7, for example, the control unit 15 displays a generated third image 28 on the display unit 12. In the third image 28, the second image 29, which is a still image, is superimposed upon the first image 23, which is a still image.

In the processing in step S7, the control unit 15 gives a mark to a part of the third image corresponding to the second image in the first image. For example, the control unit 15 gives the frame 24 to the third image 28 in FIG. 7.

In the processing in step S7, the control unit 15 may give the positional information regarding the electronic device 1 obtained in the processing in step S1 to the third image. The control unit 15 may give the information regarding the present time to the third image. In FIG. 7, for example, the control unit 15 gives the positional information "Town AAA, Ward BBB, City CCC, Prefecture DDD" and the present time "mm/dd/yy/hh/mm" to the third image 28. The control unit 15 may reduce a degree of transparency of the text indicating the positional information regarding the electronic device 1 and the present time given to the third image lower than the degree of transparency of the text indicating the positional information regarding the electronic device 1 and the present time displayed on the display unit 12 in the processing in step S1. Alternatively, the control unit 15 may set the degree of transparency of the text indicating the positional information regarding the electronic device 1 and the present time given to the third image at a third certain value. The third certain value may be set in consideration of visibility of the text indicating the positional information regarding the electronic device 1 and the present time at a time when the text indicating the positional information regarding the electronic device 1 and the present time is superimposed upon the third image. The control unit 15 may make the text indicating the positional information regarding the electronic device 1 and the present time given to the third image opaque. When the text is opaque, the degree of transparency of the text may be 0%.

After the processing in step S7, that is, after generating the third image, the control unit 15 saves the third image to the storage unit 14.

In the processing in steps S1 to S7, the control unit 15 may display, on the display unit 12, an image 32 for receiving a user operation as illustrated in FIGS. 4 to 6. The control unit 15 need not display the first to third notifications on the display unit 12 in accordance with a user operation received from the image 32. As the user becomes accustomed to operating the electronic device 1, he/she may find the first notification and the like bothersome. In this case, a possibility that the user feels bothersome can be reduced by not displaying the first to third notifications on the display unit 12 in accordance with a user operation.

In the electronic device 1 according to the present embodiment, the control unit 15 thus gives, on the basis of a touch operation performed on the display unit 12 that is displaying the first image, a mark to a part of the first image corresponding to the second image and displays the second image on the display unit 12. By giving the mark to the part of the first image corresponding to the second image, the user can promptly identify a part of a subject included in the first image magnified as the second image. For example, the user can promptly understand that the second image 29 illustrated in FIG. 7 is a magnified image of a part in the frame 24 on the subject included in the first image 23. According to the present embodiment, therefore, the technique for displaying two images improves in terms of convenience of the user.

In the present embodiment, the control unit 15 may display the first notification on the display unit 12 when displaying the first image on the display unit 12. With the first notification displayed on the display unit 12, the user can promptly touch a part to be magnified of the first image displayed on the display unit 12 even if the user has not become accustomed to operating the electronic device 1.

In the present embodiment, the control unit 15 may display the positional information regarding the electronic device 1 on the display unit 12 along with the first image. When the positional information regarding the electronic device 1 is displayed, the user can easily understand, as described above, a place where he/she is capturing the image of the subject. The control unit 15 may also increase the degree of transparency of the text indicating the positional information regarding the electronic device 1 displayed on the display unit 12. By increasing the degree of transparency of the text indicating the positional information regarding the electronic device 1, the first image does not become, as described above, difficult to see due to the positional information regarding the electronic device 1.

In the present embodiment, the control unit 15 may display the information regarding the present time on the display unit 12 along with the first image. When the present time is displayed, the user can easily understand, as described above, a time at which he/she is capturing the image of the subject. The control unit 15 may also increase the degree of transparency of the text indicating the present time displayed on the display unit 12. By increasing the degree of transparency of the text indicating the present time, the first image does not become, as described above, difficult to see due to the information regarding the present time.

In the present embodiment, the electronic device 1 may include the first camera 10 capable of generating the first image and the second camera 11 capable of generating the second image. When the electronic device 1 includes the first camera 10 and the second camera 11, specifications of the first camera 10 that generates the first image and specifications of the second camera that generates the second image can be separately set. With this configuration, the electronic device 1 can generate a second image where a part of the subject included in the first image is more magnified. A second image where a part of the subject included in the first image is more magnified can be generated, for example, by using the second camera 11 whose minimum focus distance is smaller. The first and second images can be generated with a single camera using a zoom function. When a single camera is used to generate the first and second images at the same time, however, the first and second images can be generated only at an angle of view from the camera. In the present embodiment, the user can generate the second image at any position (angle of view) using the second camera 11, which is separate from the first camera 10.

In the present embodiment, the control unit 15 may display the first image on the display unit 12 as a live view after activating the first camera 10. Since the first image is displayed on the display unit 12 as a live view, the user can check the first image on the display unit 12 in real-time. The control unit 15 may activate the second camera 11 upon receiving a touch operation performed on the display unit 12 that is displaying the first image as a live view. After activating the second camera 11, the control unit 15 may display the second image on the display unit 12 as a live view. Since the second image is displayed on the display unit 12 as a live view, the user can check the second image on the display unit 12 in real-time.

In the present embodiment, the control unit 15 may display the image of the image capture button of the second camera 11 on the display unit 12 that is displaying the first image as a live view. At this point in time, however, the control unit 15 need not allow a touch operation on the image of the image capture button of the second camera 11 to be received. Since a touch operation on the image of the image capture button is not allowed to be received, the user does not unexpectedly activate the second camera 11 by touching the image of the image capture button by mistake while the first image is being displayed as a live view.

In the present embodiment, the control unit 15 may display the second notification on the display unit 12 upon receiving a touch operation performed on the display unit 12 that is displaying the first image as a live view. The user can understand, by reading the second notification, that the first image displayed on the display unit 12 as a still image has been set as the background of the third image. The user can also understand, by reading the second notification, that the second camera 11 will be activated.

In the present embodiment, the control unit 15 may, after displaying the first image generated as a still image, display, on the display unit 12, the image of the return button for receiving a touch operation for returning to the processing for displaying the first image as a live view. Upon receiving a touch operation performed on the return button, the control unit 15 may return to the processing for displaying the first image as a live view. With this configuration, the user can return to the processing for displaying the first image as a live view when he/she does not desire to set the first image displayed on the display unit 12 as a still image as the background of the third image. The user can again generate the first image, which is a still image to be set as the background of the third image, by returning to the processing for displaying the first image as a live view.

In the present embodiment, the control unit 15 may display the third notification on the display unit 12 when displaying the second image on the display unit 12. The control unit 15 may adjust the position or the size of the second image on the display unit 12 on the basis of a touch operation performed on the display unit 12 that is displaying the second image as a live view. With this configuration, the user can easily adjust the position or the size of the second image.

In the present embodiment, the control unit 15 may generate the third image by superimposing the second image upon the first image. The control unit 15 may give a mark to a part of the generated third image corresponding to the second image in the first image. Since the third image is generated, the user can easily check the subject later.

Another Embodiment

In another embodiment, the control unit 15 performs a correction process, where a position of a mark given to the first image or the third image is corrected. In the correction process, the control unit 15 estimates, after activating the second camera 11, a part of the first image corresponding to the second image by performing image recognition on the first and second images. Any algorithm may be used for the image recognition. For example, the image recognition may be based on machine learning, pattern matching, or the like. The control unit 15 corrects the position of the mark given to the first image or the third image on the basis of the estimated part corresponding to the second image. For example, the control unit 15 may correct the position of the mark given to the first image or the third image by moving the position of the mark given to the first image or the third image to the estimated part corresponding to the second image. The control unit 15 may perform the correction process at any time after activating the second camera 11. That is, the control unit 15 may perform the correction process at any time after the processing in step S4.

Figure 8:
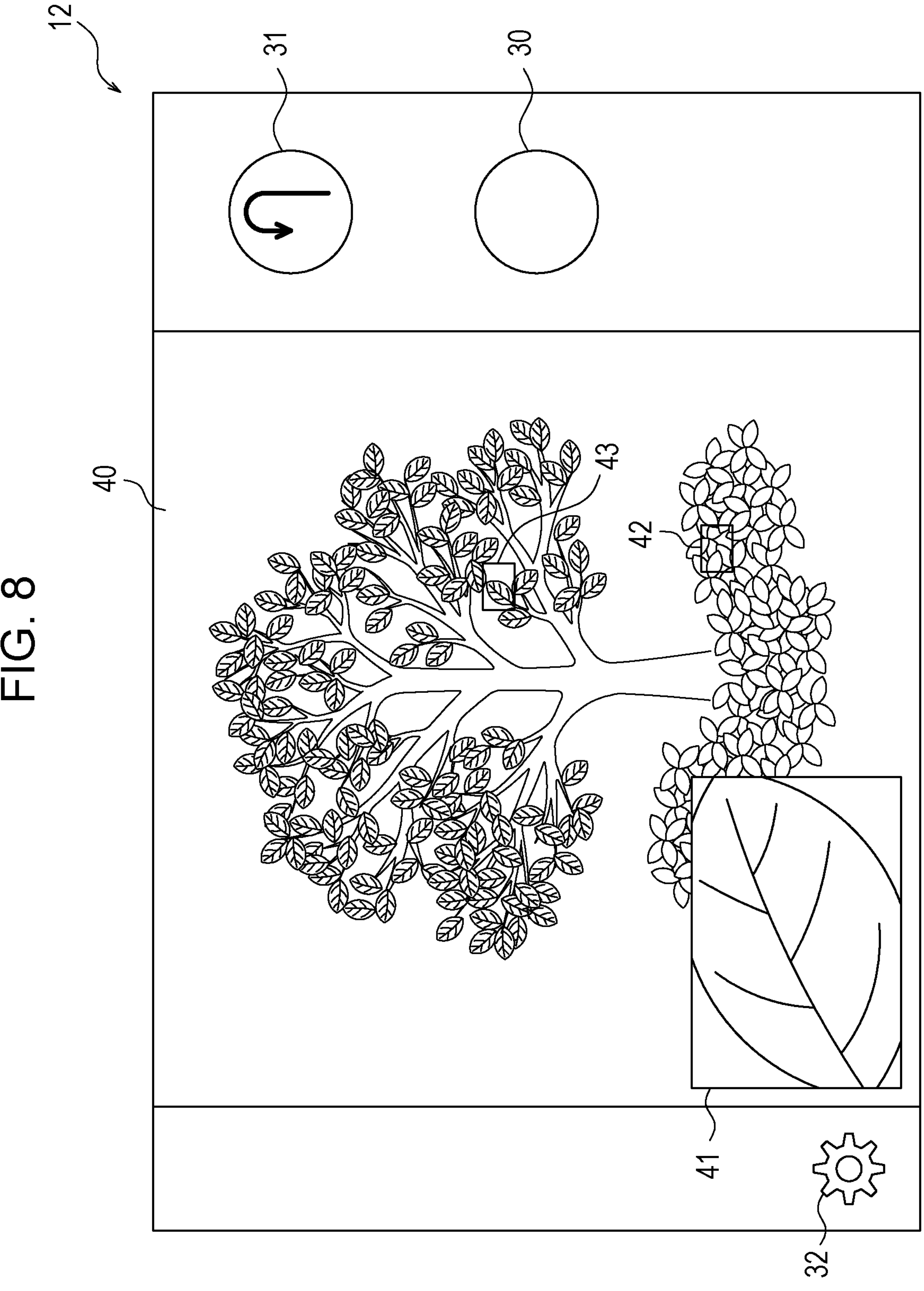
FIG. 8 is a diagram illustrating an example of a display mode of a display unit according to another embodiment of the present disclosure.

For example, a configuration illustrated in FIG. 8 corresponds to the configuration after the processing in step S4. In the configuration illustrated in FIG. 8, the control unit 15 displays a first image 40, which is a still image, on the display unit 12. The control unit 15 also displays a second image 41 on the display unit 12 as a live view. The control unit 15 gives a frame 42 to the first image 40 as the mark given to the part on which the touch operation has been received in the processing in step S2. Here, the control unit 15 estimates, by performing the image recognition on the first image 40 and the second image 41, that a part of the first image 40 corresponding to the second image 41 is a part 43. The control unit 15 corrects a position of the frame 42 by moving the frame 42 to a position of the part 43.

As described above, the user touches a part of the first image displayed on the display unit 12 whose image is to be captured by the second camera 11 at a greater magnification. When the user approaches a subject in order to generate the second image, however, the part of the first image touched by the user might become different from a part whose image is actually captured by the user using the second camera 11 at a greater magnification. In this case, too, the user can correctly identify the part of the first image or the third image corresponding to the second image since the position of the mark given to the first image or third image is corrected.

In this embodiment, other configurations and effects of the electronic device 1 are the same as or similar to those of the electronic device 1 according to the above embodiment.

Yet Another Embodiment

In yet another embodiment, the control unit 15 generates an assumed image, which is an image assumed as the second image, on the basis of a part of the first image displayed on the display unit 12 on which a touch operation has been received. For example, the control unit 15 detects a part of the first image on which a touch operation has been received in the processing in step S2. The control unit 15 generates an assumed image by magnifying, using the zoom function, an image in the part on which the touch operation has been received. The control unit 15 may generate the assumed image in the processing in step S3.

After activating the second camera 11, the control unit 15 compares the generated assumed image and the second image captured by the second camera 11. The control unit 15 determines, on the basis of a result of the comparison between the assumed image and the second image, whether a position at which the second image has been captured deviates. Here, the "position at which the second image has been captured deviates" means that the position deviates from one at which the second camera 11 is to capture an image of a subject in order to generate a second image that is a magnified image of the part of the first image on which the touch operation has been received in the processing in step S2. If determining that the position at which the second image has been captured deviates, the control unit 15 displays, on the display unit 12, a fourth notification for notifying the user that the position at which the second image has been captured deviates.

The user might desire to generate a second image that is a magnified image of a part of the first image touched thereby. If determining that the position at which the second image has been captured deviates, the control unit 15 displays, on the display unit 12, the fourth notification for notifying the user that the position at which the second image has been captured deviates. With the fourth notification, the user can easily understand whether the position at which the second image has been captured deviates. As a result, the user can generate the second image that is a magnified image of the part of the first image touched thereby.

After activating the second camera 11, the control unit 15 may display the assumed image on the display unit 12 along with the second image. With this configuration, the user can easily check, by comparing the second image and the assumed image, whether the position at which the second image has been captured deviates.

In this embodiment, other configurations and effects of the electronic device 1 are the same as or similar to those of the electronic device 1 according to the above embodiment.

Yet Another Embodiment

Figure 9:
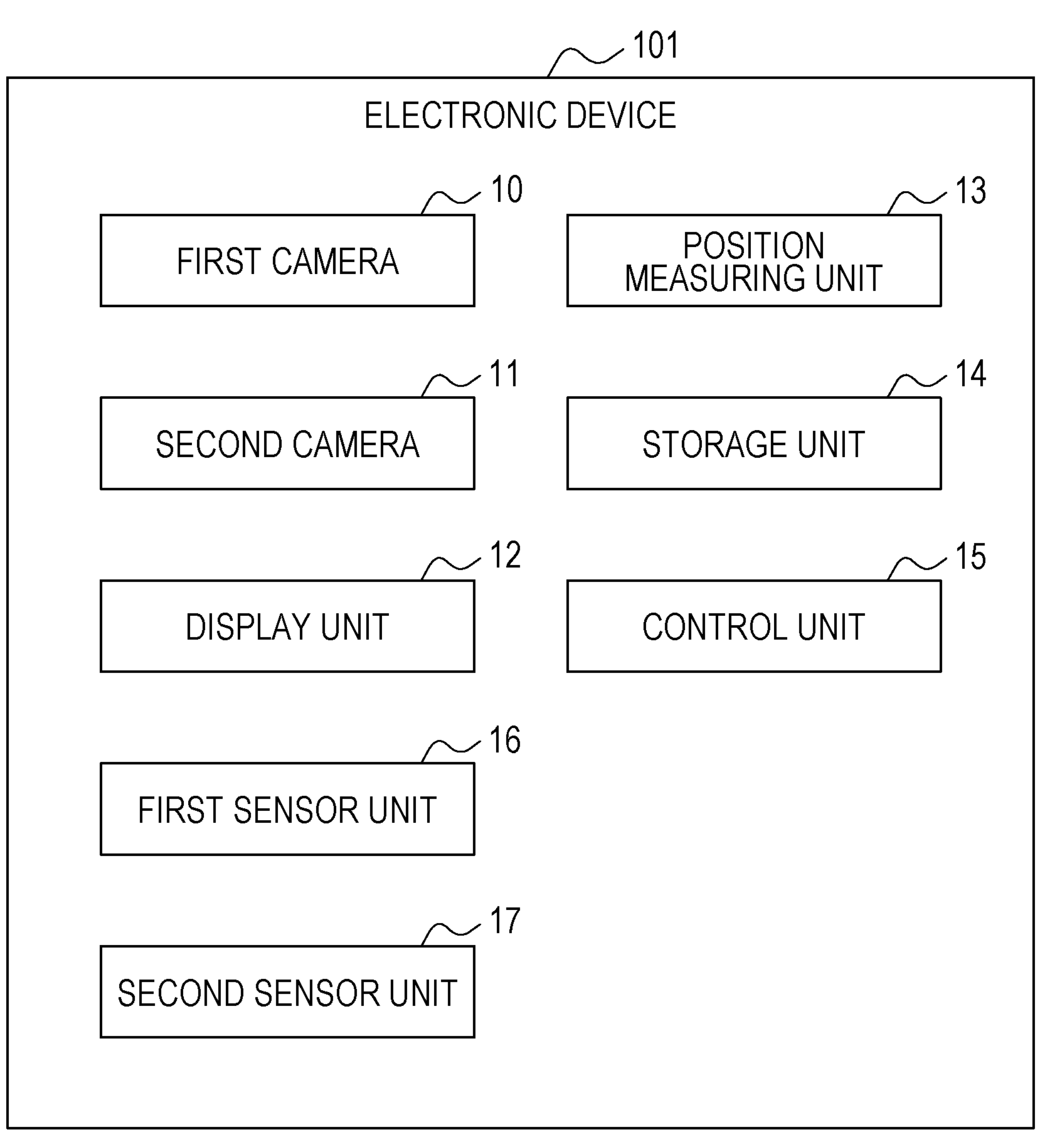
FIG. 9 is a block diagram illustrating an electronic device according to yet another embodiment of the present disclosure.

As illustrated in FIG. 9, in yet another embodiment, an electronic device 101 includes the first camera 10, the second camera 11, the display unit 12, the position measuring unit 13, the storage unit 14, the control unit 15, a first sensor unit 16, and a second sensor unit 17.

The first sensor unit 16 is capable of measuring a distance from the electronic device 1 to a subject. The first sensor unit 16 includes, for example, at least an infrared sensor, a millimeter-wave radar, a light detection and ranging (LiDAR), or the like.

The second sensor unit 17 is capable of detecting an attitude of the electronic device 1. The second sensor unit 17 includes, for example, at least a three-axis acceleration sensor, a three-axis gyro sensor, a three-axis angular velocity sensor, an inertial measurement unit (IMU), or the like.

In this embodiment, the control unit 15 performs the correction process, where the position of the mark given to the first image or the third image is corrected. After activating the second camera 11, the control unit 15 measures a distance from the electronic device 1 to a subject using the first sensor unit 16 and detects the attitude of the electronic device 1 using the second sensor unit 17. The control unit 15 corrects the position of the mark given to the first image or the third image on the basis of the measured distance from the electronic device 1 to the subject and the attitude of the electronic device 1. The control unit 15 may perform the correction process at any time after activating the second camera 11. That is, the control unit 15 may perform the correction process at any time after the processing in step S4. Since the position of the mark given to the first image or the third image is corrected, the user can correctly identify a part of the first image or the third image corresponding to the second image in the same or similar manner as in the previous embodiment.

In this embodiment, the control unit 15 may generate guide information. The guide information is used to generate the second image, which is a magnified image of a part of the first image on which a touch operation has been received in the processing in step S2. After activating the second camera 11, the control unit 15 measures a distance from the electronic device 1 to a subject using the first sensor unit 16 and detects the attitude of the electronic device 1 using the second sensor unit 17. The control unit 15 generates the guide information on the basis of a part of the first image displayed on the display unit 12 on which the touch operation has been received in the processing in step S2, the measured distance to the subject, and the detected attitude of the electronic device 1. The guide information includes information regarding the distance to the subject and information regarding a direction in which to move the second camera 11 relative to the subject. The control unit 15 displays the generated guide information on the display unit 12 while displaying the second image as a live view. While displaying the second image as a live view, the control unit 15 may update the guide information as necessary and display the updated guide information on the display unit 12. With this guide information, the user can promptly generate the second image, which is a magnified image of a touched part of the first image.

In this embodiment, other configurations and effects of the electronic device 101 are the same as or similar to those of the electronic device 1 according to the above embodiment.

Although the present disclosure has been described on the basis of the drawings and the examples, those skilled in the art can easily make various alterations and corrections on the basis of the present disclosure. The scope of the present disclosure also includes these alterations and corrections. Functions of different functional units, for example, may be rearranged without causing logical contradictions. A plurality of functional units may be combined together or further divided. The above embodiments of the present disclosure need not necessarily be faithfully implemented as described, and some features thereof may be combined or omitted as necessary when implemented. That is, those skilled in the art may alter or correct what is disclosed in the present disclosure in various ways. The scope of the present disclosure, therefore, includes such alterations and corrections. For example, in each embodiment, each functional unit, means, step, or the like may be added to another embodiment or replace a functional unit, means, a step, or the like in another embodiment without causing logical contradictions. In each embodiment, a plurality of functional units, means, steps, or the like may be combined together or further divided.

An embodiment is possible where, for example, a general-purpose computer functions as the electronic device 1 or 101 according to one of the above embodiments. More specifically, a program where processing for achieving the functions of the electronic device 1 or 101 according to one of the above embodiments may be stored in a memory of the general-purpose computer, and a processor may read and execute the program. The present disclosure, therefore, may be implemented as a program executable by a processor or a non-transitory computer-readable medium storing the program.

In an embodiment, (1) an electronic device includes at least one camera that generates a first image by capturing an image of a subject and that generates a second image by capturing a magnified image of a part of the subject, a display that receives a touch operation, and a controller that gives a mark to a part of the first image corresponding to the second image and displays the second image on the display on a basis of a touch operation performed on the display that is displaying the first image.

(2) In the electronic device according to (1), when displaying the first image on the display, the controller may display, on the display, a first notification for prompting a user to touch a part of the first image to be magnified.

(3) In the electronic device according to (1) or (2), the controller may display positional information regarding the electronic device on the display along with the first image.

(4) In the electronic device according to any of (1) to (3), the controller may increase a degree of transparency of text indicating the positional information regarding the electronic device displayed on the display.

(5) In the electronic device according to any of (1) to (4), the controller may displays information regarding present time on the display along with the first image.

(6) In the electronic device according to any of (1) to (5), the controller may increase a degree of transparency of text included in the information regarding the present time displayed on the display.

(7) In the electronic device according to any of (1) to (6), the at least one camera may include a first camera that generates the first image by capturing the image of the subject and a second camera that generates the second image by capturing the magnified image of the subject and a minimum focus distance of the second camera is smaller than a minimum focus distance of the first camera.

(8) In the electronic device according to (7), the controller may activate the first camera and then display the first image on the display as a live view. When the controller receives a touch operation performed on the display that is displaying the first image as a live view, the controller may generate the first image as a still image using the first camera and activates the second camera. The controller may display the first image, which is a still image, on the display, give a mark to a part of the first image, which is a still image, corresponding to the second image, and display the second image on the display as a live view.

(9) In the electronic device according to (7) or (8), the controller may display, on the display that is displaying the first image as a live view, an image of an image capture button of the second camera for receiving an operation command for generating the second image as a still image but need not allow a touch operation on the image of the image capture button to be received at a current point in time.

(10) In the electronic device according to (9), after activating the second camera, the controller may allow the touch operation on the image of the image capture button to be received.

(11) In the electronic device according to any of (7) to (10), when the controller receives a touch operation performed on the display that is displaying the first image as a live view, the controller may display, on the display, a second notification for notifying the user that a background has been set and that the second camera will be activated.

(12) In the electronic device according to any of (7) to (11), after displaying the generated first image, which is a still image, on the display, the controller may display, on the display, an image of a return button for receiving a touch operation for returning to processing for displaying the first image as a live view.

(13) In the electronic device according to any of (7) to (12), when the controller receives a touch operation performed on the image of the image capture button of the second camera, the controller may generate the second image as a still image using the second camera.

(14) In the electronic device according to any of (7) to (13), the controller may generate a third image by superimposing the second image generated as a still image upon the first image generated as a still image and give the mark to the generated third image.

(15) In the electronic device according to any of (7) to (14), when displaying the second image on the display, the controller may display, on the display, a third notification for notifying the user that at least a position or size of the second image is adjustable. The controller may adjust at least the position or the size of the second image on the display on a basis of a touch operation performed on the display that is displaying the second image as a live view.

(16) In the electronic device according to any of (1) to (6), the controller may generate a third image by superimposing the second image upon the first image and give the mark to the generated third image.

(17) In the electronic device according to any of (7) to (15), the controller may give the mark to a part of the first image on which a touch operation has been received on the display that is displaying the first image as a live view.

(18) In the electronic device according to (17), after activating the second camera, the controller may estimate the part of the first image corresponding to the second image by performing image recognition on the first image and the second image and correct a position of the mark on a basis of the estimated part corresponding to the second image.

(19) In the electronic device according to (17), the controller may generate an assumed image, which is assumed as the second image, on a basis of the part of the first image on which a touch operation has been received on the display that is displaying the first image as a live view. After activating the second camera, the controller may display, on the display on a basis of a result of comparison between the assumed image and the second image, a fourth notification for notifying the user that a position at which the second image has been captured deviates.

(20) In the electronic device according to (19), the controller may display the assumed image on the display along with the second image.

(21) The electronic device according to (17) further includes a first sensor that measures a distance from the electronic device to the subject and a second sensor that detects an attitude of the electronic device. After activating the second camera, the controller may measure the distance from the electronic device to the subject using the first sensor and detect the attitude of the electronic device using the second sensor. The controller may correct a position of the mark on a basis of the measured distance from the electronic device to the subject and the attitude of the electronic device.

(22) The electronic device according to (17) may further include a first sensor that measures a distance from the electronic device to the subject and a second sensor that detects an attitude of the electronic device. After activating the second camera, the controller may measure the distance from the electronic device to the subject using the first sensor and detects the attitude of the electronic device using the second sensor. The controller may display guide information for capturing the second image on the display on a basis of the part of the first image on which a touch operation has been received on the display that is displaying the first image as a live view, the measured distance to the subject, and the detected attitude of the electronic device.

According to another embodiment, (23) a display method includes giving a mark to a part of a first image corresponding to a second image and displaying the second image on a display on a basis of a touch operation performed on the display that is displaying the first image. The first image is an image generated by capturing an image of a subject. The second image is an image generated by capturing a magnified image of a part of the subject.

According to another embodiment, (24) a program causing a computer to perform operations includes giving a mark to a part of a first image corresponding to a second image and displaying the second image on a display on a basis of a touch operation performed on the display that is displaying the first image. The first image is an image generated by capturing an image of a subject. The second image is an image generated by capturing a magnified image of a part of the subject.

In the present disclosure, terms such as "first" and "second" are identifiers for distinguishing the corresponding components. The components distinguished with the terms such as "first" and "second" in the present disclosure may exchange the numbers thereof. For example, the first camera may exchange "first" for "second", which are identifiers, with the second camera. The identifiers are simultaneously exchanged. Even after the exchange of the identifiers, the components are still distinguished from each other. Identifiers may be removed. Components from which identifiers have been removed are distinguished from each other by reference numerals. The identifiers such as "first" and "second" in the present disclosure are not intended to be used as a sole basis for interpretation of order of the components or presence of an identifier with a smaller number.

What is claimed is:

1. An electronic device comprising:
at least one camera configured to:
generate a first image by capturing an image of a subject; and
generate a second image by capturing a magnified image of a part of the subject;
a display configured to receive a touch operation; and
a controller configured to:
control the display to display the first image on the display;
control the display to display a mark superimposed on a part of the first image corresponding to the part of the subject based on the touch operation; and
control the display to display the second image superimposed on the first image,
wherein the at least one camera includes:
a first camera configured to generate the first image by capturing the image of the subject; and
a second camera configured to generate the second image by capturing the magnified image of the subject, and
wherein a minimum focus distance of the second camera is smaller than a minimum focus distance of the first camera,
wherein the controller is further configured to:
activate the first camera; and then
display the first image on the display as a live view,
wherein, when the controller receives a touch operation performed on the display that is displaying the first image as a live view, the controller is further configured to:
generate the first image as a still image using the first camera; and
activate the second camera, and
wherein the controller is further configured to:
display the first image, which is a still image, on the display;
give a mark to a part of the first image, which is a still image, corresponding to the second image; and
display the second image on the display as a live view.

2. The electronic device according to claim 1,
wherein, when displaying the first image on the display, the controller is further configured to display, on the display, a first notification for prompting a user to touch a part of the first image to be magnified.

3. The electronic device according to claim 1,
wherein the controller is further configured to display positional information regarding the electronic device on the display along with the first image.

4. The electronic device according to claim 1,
wherein the controller is further configured to display information regarding present time on the display along with the first image.

5. The electronic device according to claim 1,
wherein the controller is further configured to display, on the display that is displaying the first image as a live view, an image of an image capture button of the second camera,
wherein the controller is further configured to generate the second image as a still image, when receiving an operation command to the image capture button of the second camera, and
wherein the controller is further configured not to allow a touch operation on the image of the image capture button to be received at a current point in time.

6. The electronic device according to claim 1,
wherein, when the controller receives a touch operation performed on the display that is displaying the first image as a live view, the controller is further configured to display, on the display, a second notification notifying a user that a background has been set and that the controller activates the second camera.

7. The electronic device according to claim 1,
wherein, after displaying the generated first image, which is a still image, on the display, the controller is further configured to display, on the display, an image of a return button, receiving a touch operation for returning to processing for displaying the first image as a live view.

8. The electronic device according to claim 7, wherein, when the controller receives a touch operation performed on the image of an image capture button of the second camera, the controller is further configured to generate the second image as a still image using the second camera.

9. The electronic device according to claim 1, wherein, when displaying the second image on the display, the controller is further configured to display, on the display, a third notification notifying a user that at least a position or size of the second image is adjustable, and wherein the controller is further configured to adjust at least the position or the size of the second image on the display on a basis of a touch operation performed on the display that is displaying the second image as a live view.

10. The electronic device according to claim 1, wherein the controller is further configured to give the mark to a part of the first image on which a touch operation has been received on the display that is displaying the first image as a live view.

11. The electronic device according to claim 10, wherein, after activating the second camera, the controller is further configured to:

estimate the part of the first image corresponding to the second image by performing image recognition on the first image and the second image; and correct a position of the mark on a basis of the estimated part corresponding to the second image.

12. The electronic device according to claim 10, wherein the controller is further configured to generate an assumed image, which is assumed as the second image, on a basis of the part of the first image on which a touch operation has been received on the display that is displaying the first image as a live view, and wherein, after activating the second camera, the controller is further configured to display, on the display on a basis of a result of comparison between the assumed image and the second image, a fourth notification notifying a user that a position at which the second image has been captured deviates.

13. The electronic device according to claim 10, further comprising:

a first sensor configured to measure a distance from the electronic device to the subject; and a second sensor configured to detect an attitude of the electronic device, wherein, after activating the second camera, the controller is further configured to:

measure the distance from the electronic device to the subject using the first sensor; and detect the attitude of the electronic device using the second sensor, and wherein the controller is further configured to correct a position of the mark on a basis of the measured distance from the electronic device to the subject and the attitude of the electronic device.

14. The electronic device according to claim 10, further comprising:

a first sensor configured to measure a distance from the electronic device to the subject; and a second sensor configured to detect an attitude of the electronic device, wherein, after activating the second camera, the controller is further configured to measure the distance from the electronic device to the subject using the first sensor; and detect the attitude of the electronic device using the second sensor, and wherein the controller is further configured to display guide information capturing the second image on the display on a basis of the part of the first image on which a touch operation has been received on the display that is displaying the first image as a live view, the measured distance to the subject, and the detected attitude of the electronic device.

15. A display method comprising:

activating a first camera and then displaying a first image on a display as a live view;

receiving a touch operation performed on the display that is displaying the first image as the live view;

generating, by the first camera, a first image by capturing an image of a subject as a still image and activating a second camera, in response to receiving the touch operation;

displaying the first image, which is the still image, on the display;

generating, by the second camera, a second image by capturing a magnified image of a part of the subject, wherein a minimum focus distance of the second camera is smaller than a minimum focus distance of the first camera;

displaying a mark superimposed on a part of the first image, which is the still image, corresponding to the second image based on the touch operation; and displaying the second image superimposed on the first image as a live view.

16. A non-transitory computer-readable recording medium causing a computer to perform operations comprising:

activating a first camera and then displaying a first image on a display as a live view;

receiving a touch operation performed on the display that is displaying the first image as the live view;

generating, by the first camera, a first image by capturing an image of a subject as a still image and activating a second camera, in response to receiving the touch operation;

displaying the first image, which is the still image, on the display;

generating, by the second camera, a second image by capturing a magnified image of a part of the subject, wherein a minimum focus distance of the second camera is smaller than a minimum focus distance of the first camera;

displaying a mark superimposed on a part of the first image, which is the still image, corresponding to the second image based on the touch operation; and displaying the second image superimposed on the first image as a live view.

* * * * *